(12) United States Patent
Fasske

(10) Patent No.: US 6,439,089 B1
(45) Date of Patent: Aug. 27, 2002

(54) APPARATUS FOR SHEARING MULTI-WALLED WORKPIECES

(75) Inventor: Wayne C. Fasske, Southington, CT (US)

(73) Assignee: Shear, LLC, Hartford, CT (US)

( * ) Notice: Subject to any disclaimer, the term of this patent is extended or adjusted under 35 U.S.C. 154(b) by 14 days.

(21) Appl. No.: 09/658,353

(22) Filed: Sep. 11, 2000

Related U.S. Application Data

(63) Continuation-in-part of application No. 08/996,938, filed on Dec. 23, 1997, now Pat. No. 6,116,131, which is a continuation-in-part of application No. 08/777,939, filed on Dec. 23, 1996, now Pat. No. 5,943,930.

(51) Int. Cl.⁷ .............................. B26D 3/00; B26D 7/02
(52) U.S. Cl. ................... 83/13; 83/54; 83/456; 83/468.7
(58) Field of Search .................. 83/456, 453, 465, 83/468.7, 13, 54

(56) References Cited

U.S. PATENT DOCUMENTS

| 53,416 A | 3/1866 | Cole |
| 175,182 A | 3/1876 | Sulsser et al. |
| 257,286 A | 5/1882 | Bruce |
| 284,496 A | 9/1883 | Seymour |
| 606,261 A | 6/1898 | Yates ........................ 83/468.7 |
| 1,884,001 A | 10/1932 | Lewis ......................... 83/456 |
| 3,851,557 A | 12/1974 | Vierstraete .................. 83/456 |
| 3,877,690 A | 4/1975 | Owens ........................ 83/456 |
| 3,895,551 A | 7/1975 | Goransson ................... 83/456 |
| 3,938,413 A | 2/1976 | Goettel et al. ................ 83/145 |
| 3,956,952 A | 5/1976 | Goettel et al. ................ 83/145 |
| 4,218,946 A | 8/1980 | Witzler ........................ 83/636 |
| 4,337,680 A | 7/1982 | Borzym ....................... 83/456 |
| 4,338,839 A | 7/1982 | Farrell, Sr. et al. ........... 83/620 |
| 4,338,840 A | 7/1982 | Farrell, Sr. et al. ........... 83/622 |
| 4,437,374 A | 3/1984 | Borzym ....................... 83/456 |
| 4,659,029 A | 4/1987 | Rodriguez .................... 242/56 |
| 4,831,910 A | 5/1989 | Poulsen ....................... 83/693 |
| 4,846,029 A | 7/1989 | Gardner ....................... 83/456 |
| 4,848,723 A | 7/1989 | Borzym ....................... 83/456 |
| 4,872,384 A | 10/1989 | Borzym ....................... 83/456 |
| 5,090,285 A | 2/1992 | Kondô ......................... 83/636 |
| 5,105,703 A | 4/1992 | Kondô ......................... 83/636 |
| 5,125,306 A | 6/1992 | Borzym ....................... 83/456 |
| 5,161,444 A | 11/1992 | Kusakabe et al. ............. 83/456 |
| 5,463,920 A | 11/1995 | Korb ........................... 83/56 |
| 5,943,930 A | 8/1999 | Fasske ........................ 83/456 |
| 6,116,131 A | 9/2000 | Fasske ........................ 83/456 |

Primary Examiner—M. Rachuba
(74) Attorney, Agent, or Firm—Cummings & Lockwood

(57) ABSTRACT

In an apparatus for shearing multi-walled workpieces, such as metal framing studs, a base support defines a blade gap therebetween, and a guillotine-like blade is slidably received within the gap for shearing the workpieces. A pair of first and second supports are each slidably mounted on a respective base support and are each spaced apart from and face each other to thereby define an adjustable-width channel for receiving a workpiece. Each of the supports defines a blade-like edge and may be oriented relative to one another such that the axis of the channel, and a longitudinal axis of the workpiece received within the channel may be oriented at a desired angle relative to the blade. A base support may be provided which defines a support surface extending between the elongated edges. A pair of base members may be slidably disposed on the base support and the first and second pairs of supports may each include a pair of upstanding members at least one pair of which is slidably disposed on the base members. A pair of shims may be disposed between a portion of a respective pair of upstanding members and a portion of the base members to thereby separate the upstanding and base members to define a dimension of the blade gap. The guillotine-like blade may have a cutting edge comprising three cutting tips which cooperates with the blade-like edges of the supports to shear the workpiece along a line of contact

20 Claims, 10 Drawing Sheets

APPARATUS FOR SHEARING MULTI-WALLED WORKPIECES

CROSS REFERENCE TO RELATED APPLICATION

This patent application is a continuation-in-part of U.S. patent application Ser. No. 08/996,938 U.S. Pat. No. 6,116, 131 entitled "APPARATUS FOR SHEARING MULTI-WALLED WORKPIECES", filed on Dec. 23, 1997 and herewith, which is a continuation-in-part of U.S. patent application Ser. No. 08777,939 entitled "APPARATUS FOR SHEARING MULTI-WALLED WORKPIECES", filed on Dec. 23, 1996, and issued on Aug. 31, 1999 as U.S. Pat. No. 5,943,930, the disclosures of each of which are incorporated herein by reference.

FIELD OF THE INVENTION

The present invention relates to apparatus for cutting sheet-like material, and more particularly, to apparatus for shearing workpieces of different sizes and shapes having at least two walls formed of sheet-like material, such as metal framing studs and eavestroughs.

BACKGROUND INFORMATION

Metal framing studs are used in the building industry, and particularly the commercial building industry, for constructing framework and mounting thereto wallboards formed of sheet rock and other types of materials. Although framing studs may be formed in a variety of different shapes and configurations, a common type of stud is formed of metal, and defines a back wall and two parallel side walls forming a generally U-shaped cross section. Conmmercially available studs are supplied in standard lengths, and therefore if a non-standard length is required, a standard stud must be trimmed, frequently by the builder, to the desired length.

Stud trimming is often performed at job sites by employing a chop saw having an abrasive wheel, disk or like rotatably-driven blade, which is pivotally mounted on a base for movement into and out of engagement with a workpiece. The chop saw blades can wear relatively quickly, particularly when used to cut heavy-gauge workpieces. In addition, because of limitations in blade size, many chop saws cannot cut through relatively large-width studs with a single cutting stroke, but rather require the stud to be flipped over after cutting through one side, and then cut again in order to cut through its entire width. Use of a chop saw to trim framing studs or like workpieces can therefore be a relatively time-consuming, labor-intensive and expensive operation, particularly at large job sites or jobs otherwise requiring a large number of studs or like workpieces to be trimmed.

Manufacturers of framing studs, eavestroughs or like workpieces have employed machines for shearing such workpieces to their desired lengths at the time of manufacture. A typical such machine employs a guillotine-like cutting blade slidably received within a blade gap, and a pair of die plates mounted on opposite sides of the guillotine relative to each other for slidably receiving and supporting the workpiece during a cutting operation. Each die plate defines an aperture which is shaped to conform to the shape of a respective type and size of workpiece for conformably engaging the workpiece. A typical such apparatus is shown in U.S. Pat No. 4,218,946 to Witzler, entitled "Cutter Assembly For Eavestrough-Forming Machine".

One of the drawbacks of these types of conventional shearing machines is that they cannot be conveniently employed for cutting a variety of different pre-manufactured studs, eavestroughs or like workpieces. Each die plate typically forms an aperture defining a fixed shape and dimension conforming to a manufacturer's particular type and size of workpiece, and therefore can only be used with the respective type of workpiece. In addition, framing studs and like workpieces frequently become bent or otherwise slightly deformed during transportation, thus preventing such workpieces from being received within their corresponding die plates. Accordingly, although such a machine could be used to cut a variety of framing studs or like workpieces by providing a variety of die plates having apertures of different shapes and configurations, this would not only be relatively expensive, but any slightly deformed workpieces could not be received within the die plates, and thus could not be cut by the machine.

Accordingly, it is an object of the present invention to overcome the drawbacks and disadvantages of the above-described machinery for cutting metal studs, eavestroughs or like multi-walled workpieces.

SUMMARY OF THE INVENTION

The present invention is directed to an apparatus for shearing workpieces having at least two sides formed of sheet-like material. The apparatus comprises first means defining an elongated edge that is engageable with a first side of the workpiece for contacting and supporting the first side of the workpiece along a line defined by the edge. The apparatus further comprises second means defining an elongated edge that is engageable with a second side of the workpiece for contacting and supporting the second side of the workpiece. The second means is spaced apart from and faces the first means and defines a channel therebetween for receiving the workpiece. Each of the first and second means is independently movable relative to the other for engaging with each elongated edge the respective sides of workpieces of different widths. A shearing means of the apparatus is slidably received within a gap formed adjacent to the elongated edges of the first and second means, and is movable between a first position spaced away from the workpiece within the channel and a second position in engagement with the workpiece for shearing the workpiece along a line of contact. At least one of the first and second means is selectively positionable relative to the other for orienting an axis of the workpiece at a predetermined angle relative to a plane of the shearing means and shearing the workpiece at a predetermined angle relative to its axis.

In a preferred embodiment of the present invention, the first and second means for contacting and supporting the workpiece comprises first and second pairs of supports. A base support may be provided which defines a support surface extending between the elongated edges and which is engageable with a third side of the workpiece. A pair of base members may be slidably disposed on the base support, and the first and second pairs of supports may each comprise a pair of upstanding members wherein at least one of which is slidably disposed on the base members. A pair of shims each may be disposed between a respective pair of upstanding members and the base members to thereby define a dimension of the gap. The shearing means may comprise a blade having a cutting edge comprising at least three cutting tips. Optionally, the cutting edge may comprise at least four substantially planar surfaces wherein each of the planar surfaces are separated one from another by one cutting tip.

One advantage of the apparatus of the present invention, is that it is adaptable to rapidly and effectively shear a variety of workpieces, such as framing studs, having different sizes, shapes and/or configurations. For example, in one particular embodiment of the invention, each pair of upstanding members is connected together and, therefore, is movable as a unit for ease in accepting various workpieces for cutting thereof.

Other objects and advantages of the present invention will become apparent in view of the following detailed description and accompanying drawings.

DETAILED DESCRIPTION OF THE PREFERRED EMBODIMENTS

Figure 1:
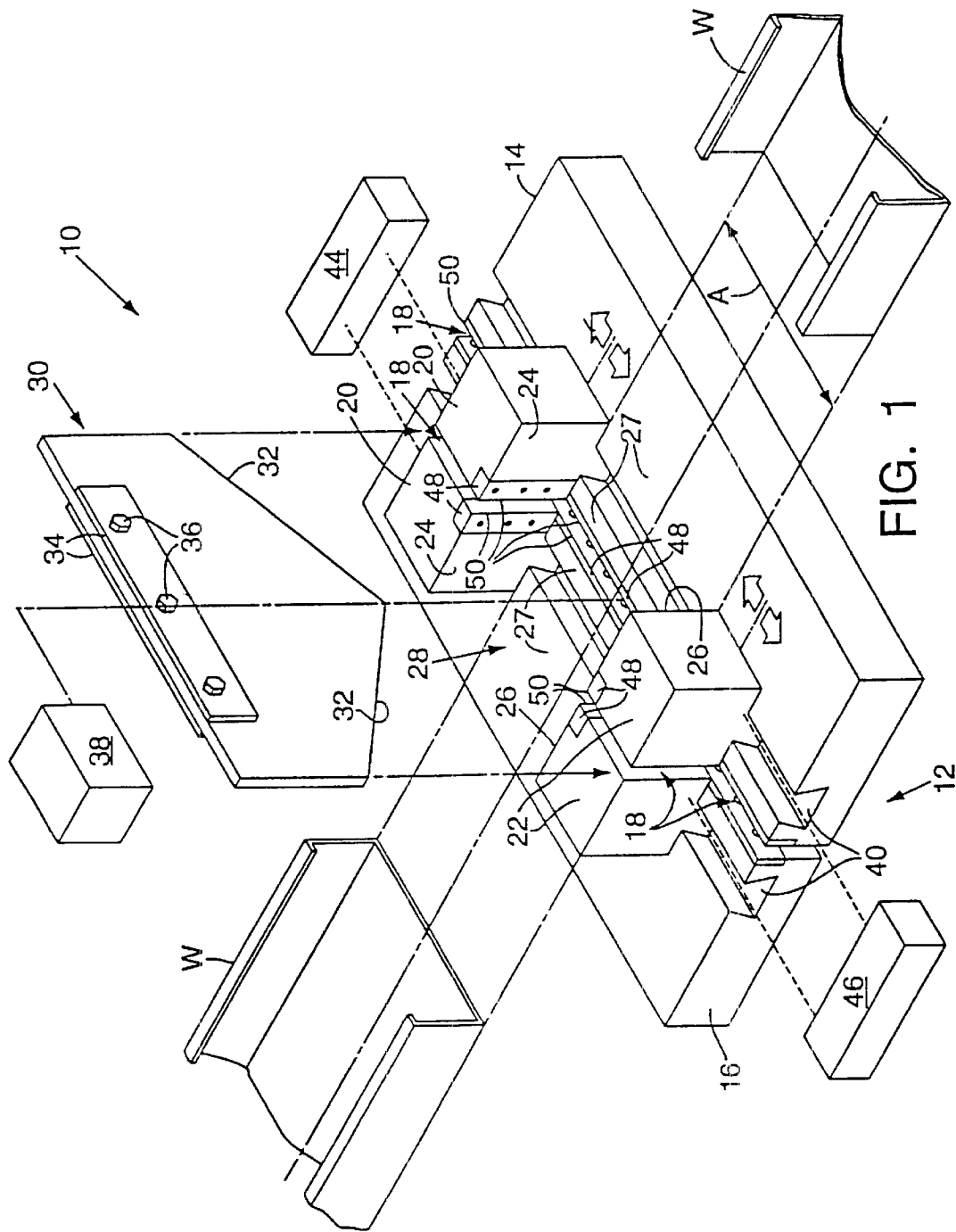
FIG. 1 is a partial schematic, perspective view of an apparatus embodying the present invention for cutting framing studs, or like multi-sided workpieces, of different widths and/or configurations.

In FIG. 1, an apparatus embodying the present invention is indicated generally by the reference numeral 10. The apparatus 10 comprises a base assembly 12 including a first base support 14, and a second base support 16 spaced apart from the first base support to define a blade gap 18 therebetween. A pair of first supports 20 are each movably mounted on one side of the first and second base supports 14 and 16, respectively, and a pair of second supports 22 are each movably mounted on the opposite sides of the first and second supports, respectively. Each first support 20 defines at least one first support surface 24 for engaging a first side of a workpiece "W", and each second support 22 defines at least one second support surface 26 for engaging a second side of the workpiece W. Each base support 14 and 16 similarly defines a third support surface 27 extending between the first and second support surfaces 24 and 26, respectively, for engaging and supporting a third side of the workpiece. As also shown in FIG. 1, the first support surfaces 24 are spaced apart from and face the second support surfaces 26, thus defining a channel 28 therebetween for receiving the workpiece W. In accordance with the present invention, at least one of the first and second support surfaces 24 and 26, respectively, is movable relative to the support surface on the opposite side of the channel 28 for adjusting the width "A" of the channel to thereby engage with each support surface the respective sides of workpieces of different widths.

As shown in FIG. 1, each first support 20 is mounted adjacent to the inner edge of the respective base section 14 or 16 so that the two first supports are closely spaced relative to each other to further define the blade gap 18 therebetween. Similarly, the two second supports 22 are each mounted adjacent to the inner edge of the respective base support, and are closely spaced relative to each other to further define the blade gap 18 therebetween.

A guillotine-like blade 30 is slidably received and retained within the blade gap 18 so that it is either in sliding contact with, or spaced immediately adjacent to the surfaces of the first, second and base supports forming the blade gap. As shown in FIG. 1, the blade 30 is approximately planar, and defines on its lower edge an elongated, approximately V-shaped cutting edge 32. A support flange 34 is fixedly secured to the upper edge of the blade 30 by suitable fasteners 36, and as shown schematically in FIG. 1, a suitable drive source 38 is coupled to the support flange 34 of the blade. As indicated by the arrows and described in further detail below, the drive source 38 is adapted to drive the blade 30 downwardly into engagement with a workpiece W received within the channel 28 to shear the workpiece, and to drive the blade upwardly within the channel during non-use so that it is spaced above either the third support surface 27 of the base, or a workpiece W seated on the third support surface. As will be recognized by those skilled in the pertinent art, the drive source 38 may take the form of any of numerous different drive sources that are currently or later become known to those of ordinary skill in the pertinent art, such as a lever and linkage assembly or like mechanical drive system, a hydraulic or pneumatic drive system employing one or more hydraulic or pneumatic cylinders coupled to the blade, or an electric motor coupled to the blade through a suitable drive train, such as a linkage assembly, belt drive or gear train.

In the preferred embodiment of the present invention, and as indicated by the arrows in FIG. 1, the pairs of first supports 20 and second supports 22 are movable relative to each other and the third support surface 27 in order to adjust the width of the channel 28 and thereby accommodate workpieces of different widths, and also to cut the workpiece "W" at a predetermined angle relative to its longitudinal or elongated axis. Accordingly, the apparatus 10 includes means for moving one of the pairs of first and second supports relative to the other, or for moving both pairs of first and second supports relative to each other. As shown typically in FIG. 2, each base support 14 and 16 defines an elongated mounting recess or groove 40 spaced adjacent to and extending approximately parallel to the blade gap 18. Each of the first and second supports 20 and 22, respectively, defines a corresponding mounting surface 42 slidably received within the respective mounting recess for moving the respective support along the recess.

Figure 2:
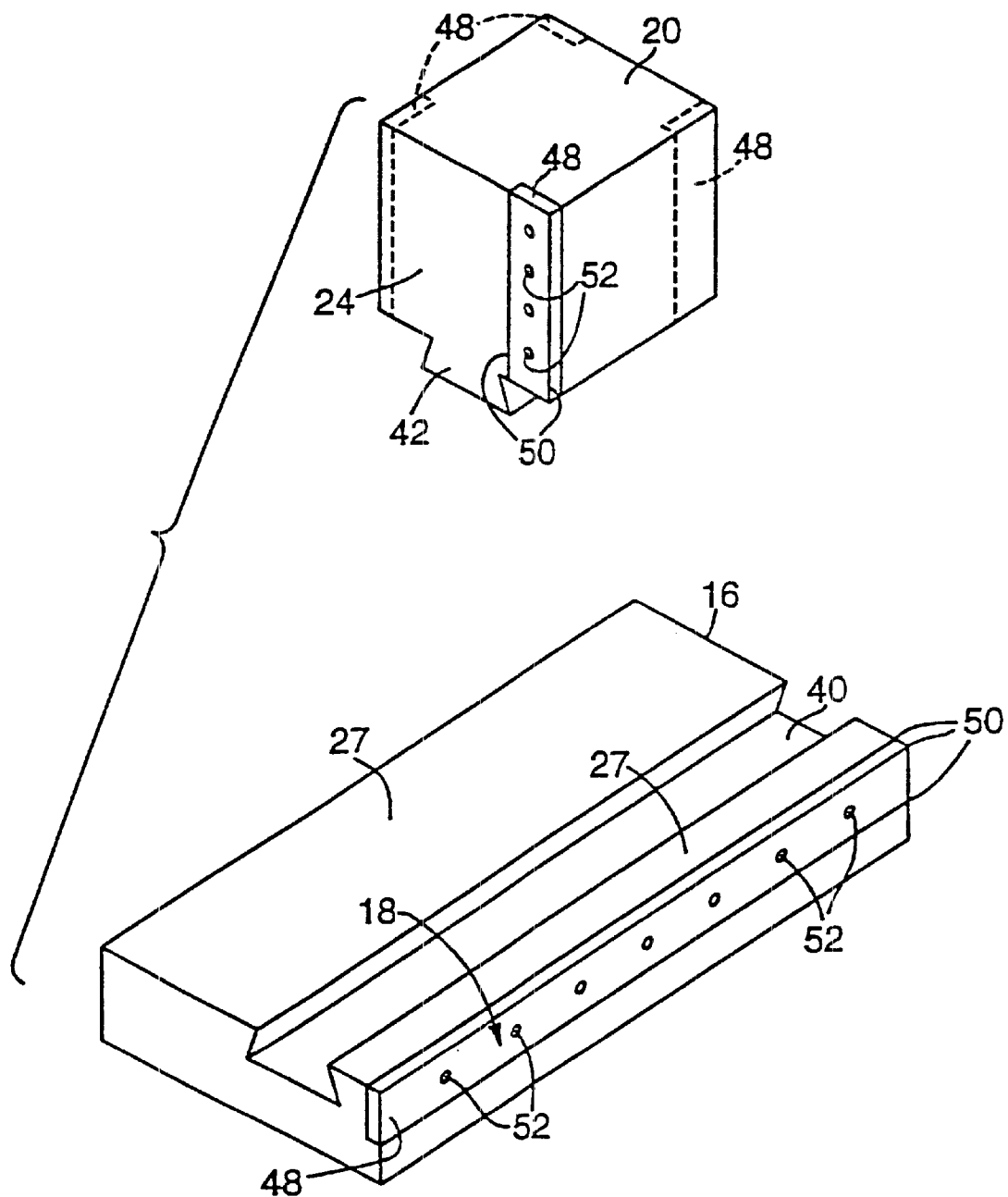
FIG. 2 is an exploded perspective view of a typical base and side support of the apparatus of FIG. 1.

As shown typically in FIG. 2, in the embodiment of the present invention illustrated, each mounting surface 42 is shaped in the form of a dove-tail flange projecting downwardly from the underside of the respective support, and extending along the width of the support. Similarly, the mounting recesses 40 are each correspondingly shaped in the form of a dove-tail groove for slidably receiving and retaining the dove-tail flanges 42. As will be recognized by those skilled in the pertinent art, the illustrated means for moving the supports is only exemplary, and numerous other structures may equally be employed. For example, the mounting recesses and mounting surfaces or flanges of the supports may take any of numerous different shapes and/or configurations; alternatively, the recesses may be formed in the first and second supports, and the elongated flanges may in turn be formed by the-base supports.

In the embodiment of the present invention illustrated, the first supports 20 and second supports 22 are solid, and formed of metal, such as steel, and are therefore substantially heavier than the typical workpiece W shown in FIG. 1. Accordingly, with this type of construction it may not be necessary to include means for fixedly securing the supports once moved into engagement with the respective sides of the workpiece. If necessary, however, a stop or like clamping mechanism (not shown) may be employed with each of the first and second supports for locking each support in place once moved within the respective groove into its desired position.

Alternatively, the apparatus 10 may further include means for driving either one pair of the first and second supports relative to the other, or for driving both pairs of first and second supports relative to each other. As shown schematically in FIG. 1, a first drive source 44 is coupled to the pair of first supports 20 for moving the supports within the grooves 40, and a second drive source 46 is coupled to the second pair of supports 22 for moving the second supports within the grooves relative to the first supports. The drive sources 44 and 46 may be any of numerous suit able drive sources known to those of ordinary skill in the pertinent art, and each may include, for example, an electric motor coupled to one or both supports by a suitable drive train, such as a rack and pinion, toothed belt and pulley, or lead screw arrangement. A manual drive system could likewise be employed, including, for example, a hand-wheel or crank coupled through a suitable drive train, such as a rack and pinion or lead screw arrangement, to the respective supports. In either case, each support may be independently driven, or each support pair may be simultaneously driven by the respective drive source.

As also shown in FIGS. 1 and 2, each of the first, second and base supports includes at least one blade-like edge formed adjacent to and defining the blade gap 18. As shown typically in FIG. 2, each of the base supports 14 and 16, and first and second supports 20 and 22, respectively, includes at least one blade bar 48 removably attached to a corner of the support forming the blade gap 18, and each blade bar defines a plurality of elongated blade-like edges 50. Each blade bar 48 extends along substantially the entire extent of the respective corner of the support, and thus defines a respective cutting edge 50 for shearing the workpiece W in cooperation with downward movement of the guillotine-like blade 30. Each blade bar 48 is removably attached to the respective support by a plurality of fasteners, shown typically at 52 in FIG. 2. Accordingly, when one of the blade-like edges 50 becomes worn, a new blade-like edge of the bar may be employed by releasing the respective fasteners 52, turning the bar on the support to present the new blade-like edge to the gap, and securing the fasteners in order to fixedly secure the bar and edge in place.

As may be recognized by those skilled in the pertinent art, each blade-like edge 50 may likewise be formed by the respective corner of the support. In this case, each support is hardened to form on its corners durable and effective blade-like edges. In addition, as shown typically in phantom lines in FIG. 2, each of the first and second supports 20 and 22, respectively, may include a plurality of blade bars 48 mounted on each of the corners of the support. In this case, each of the first and second supports may be removed, rotated, and re-mounted on the respective base support in order to present the different corners of the support, and thus the different blade bars, to the blade gap 18. Alternatively, rather than rotate the supports, the blade bars may be interchanged with one another without removing the first and second supports from the base supports. In addition, the apertures formed in each blade bar 48 for receiving the fasteners 52 may each define an elongated or other shape in order to permit a fine adjustment of the position of the blade bar on the respective support.

The workpiece W shown in FIG. 1 is in the form of a typical framing stud, defining a back wall and two parallel side walls forming a generally U-shaped cross section. Accordingly, when this type of workpiece is received within the channel 28, the back wall of the stud is seated in engagement with the third support surface 27 of the base assembly, and the two side walls of the stud are each seated in engagement with the support surfaces of the first or second supports, respectively. However, as will be recognized by those skilled in the pertinent art, the apparatus of the present invention is adaptable for use with a variety of different types of framing studs, eavestroughs and other types of workpieces. In addition, although the typical framing stud W is made of metal, the apparatus of the present invention may also be used to shear workpieces formed of other types of materials, including any of numerous different types of polymers, cardboard, paper, wood, or laminations formed of one or more of these or like materials.

In the operation of the apparatus of the present invention, a workpiece, such as the workpiece W in the form of a typical framing stud, is received within the channel 28 with its back wall seated in contact with the third support surface 27. The first supports 20 and second supports 22 are then moved inwardly toward each other until the first and second support surfaces 24 and 26, respectively, are moved into contact with the side walls of the workpiece to prevent any lateral movement of the workpiece within the channel. If necessary, and as described in further detail below with reference to the embodiments of FIGS. 6–8, the first and second supports, 20 and 22, respectively, may be adjusted laterally relative to each other to set the elongated axis of the workpiece "W" at a predetermined angle relative to the plane of the blade 30 to cut the workpiece at that angle.

The point at which the workpiece is to be cut is then placed over the blade gap 18, and the blade 30 is then driven downwardly by the drive source 38 into engagement with workpiece. The apex or lowermost point of the V-shaped cutting edge 32 of the blade first pierces the center of the back wall of the workpiece, and then as the blade is driven downwardly, the inclined cutting edge 32 of the blade cooperates with the blade-like edges 50 of the base supports 14 and 16, and first and second supports 20 and 22 to rapidly shear the stud outwardly from its centerline. Thin strips of scrap material, each having a width slightly less than that of the blade gap 18, are peeled away from the workpiece along the line of contact of the blade, and in turn fall through the portion of the blade gap between the two base supports. The illustrated V-shaped blade configuration is particularly advantageous in rapidly cutting and preventing deformation of the workpiece. Once the supports 20 and 22 are set in place, like workpieces may then be rapidly fed through the apparatus and trimmed to their desired lengths in the same manner.

In order to accommodate workpieces having a shape substantially different than that of the workpiece W of FIG. 1, it may be desirable to provide means for adjusting the angular positions of the first support surfaces 24 and/or the second support surfaces 26 relative to the third support surface 27 in order to better conform the support surfaces to the external shape of the workpiece. This may be accomplished, for example, by providing each of the first and second supports with a plurality of support surfaces oriented at different angles relative to the base support surface, as shown in FIG. 3, or by providing each of the first and second supports with adjustable support surfaces for adjusting the angular relationship of each support surface relative to the base support surface, as shown in FIG. 4.

Figure 3:
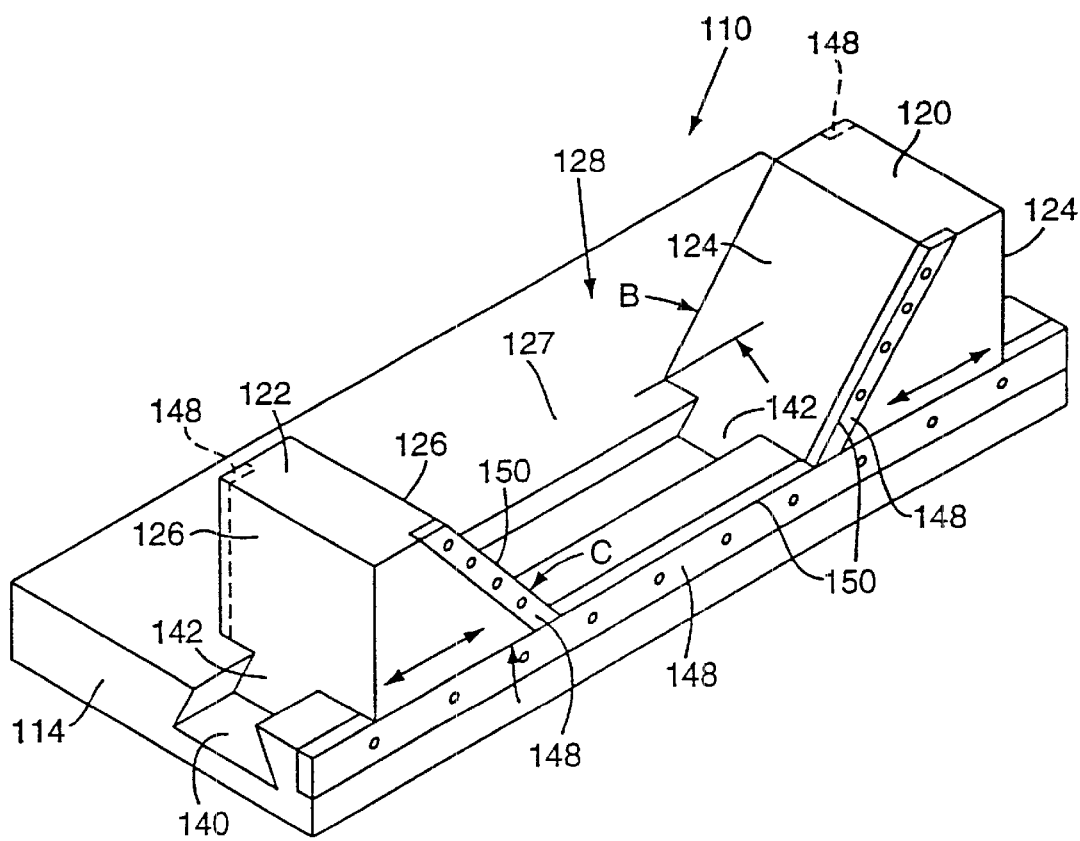
FIG. 3 is a perspective view of the typical base, first and second supports of another embodiment of an apparatus of the present invention wherein each of the first and second supports includes a plurality of support surfaces oriented at different angles relative to the base support surface for accommodating workpieces of varying configurations.

Turning first to FIG. 3, the apparatus 110 is substantially the same as the apparatus 10 described above, and therefore like reference numerals preceded by the numeral I are used to indicate like elements. Each of the first and second supports 120 and 122, respectively, includes four support surfaces 124 or 126 on the four vertical sides of the support, and each of the first and second support surfaces may be formed at a predetermined angle relative to the base support surface 127. As shown typically in FIG. 3, one of the first support surfaces 124 is oriented at a predetermined acute angle "B" relative to the base support surface 127, and one of the second support surfaces 126 is oriented at a predetermined acute angle "C" relative to the base support surface. The angles "B" and "C" may be equal, as shown, or each may be another angle selected to conform to the shape of a -desired workpiece. Similarly, other support surfaces (not shown) may be oriented at different predetermined angles, as desired, in order to accommodate workpieces of different configurations. The first and second supports 120 and 122, respectively, may be removed and rotated on the base supports in the same manner as described above with respect to the previous embodiment in order to present each of the different support surfaces to the channel 128.

Figure 4:
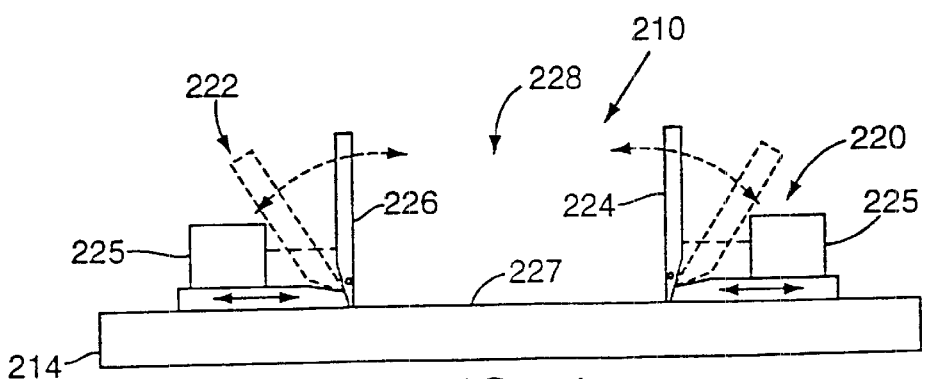
FIG. 4 is a schematic, front elevational view of another embodiment of an apparatus of the present invention wherein the first and second supports include adjustable support surfaces for adjusting the angular relationship of each support surface relative to the base support surface in order to accommodate workpieces of varying configurations.

Turning to FIG. 4, the apparatus 210 is substantially the same as the apparatus 10 described above, and therefore like reference numerals preceded by the numeral 2 are used to indicate like elements. In this embodiment, each of the first and second supports 220 and 222 includes an adjustable support surface 224 or 226 for adjusting the angular orientation of the support surface relative to the base support surface 227 in order to accommodate workpieces of varying configurations. As shown in FIG. 4, the first and second support surfaces 224 and 226 are each pivotally mounted on the respective base of the support, and an angular adjustment drive 225 is coupled to each of the first and second support surfaces for adjusting their angular positions. Accordingly, as indicated by the arrows, and the exemplary illustration in phantom lines of FIG. 4, each support surface may be pivotally adjusted on the base of the respective support in order to conform to the external configurations of a variety of different workpieces. The angular adjustment drives 225 may be any of various drive systems known to those of ordinary skill in the pertinent art, and each may include, for example, a hand-wheel or crank coupled through a suitable gear train, such as a worm gear arrangement, to the respective support surface for adjusting its angular position; or may likewise include an electric motor coupled through a like gear train to each support surface for adjusting its angular position.

Figure 5:
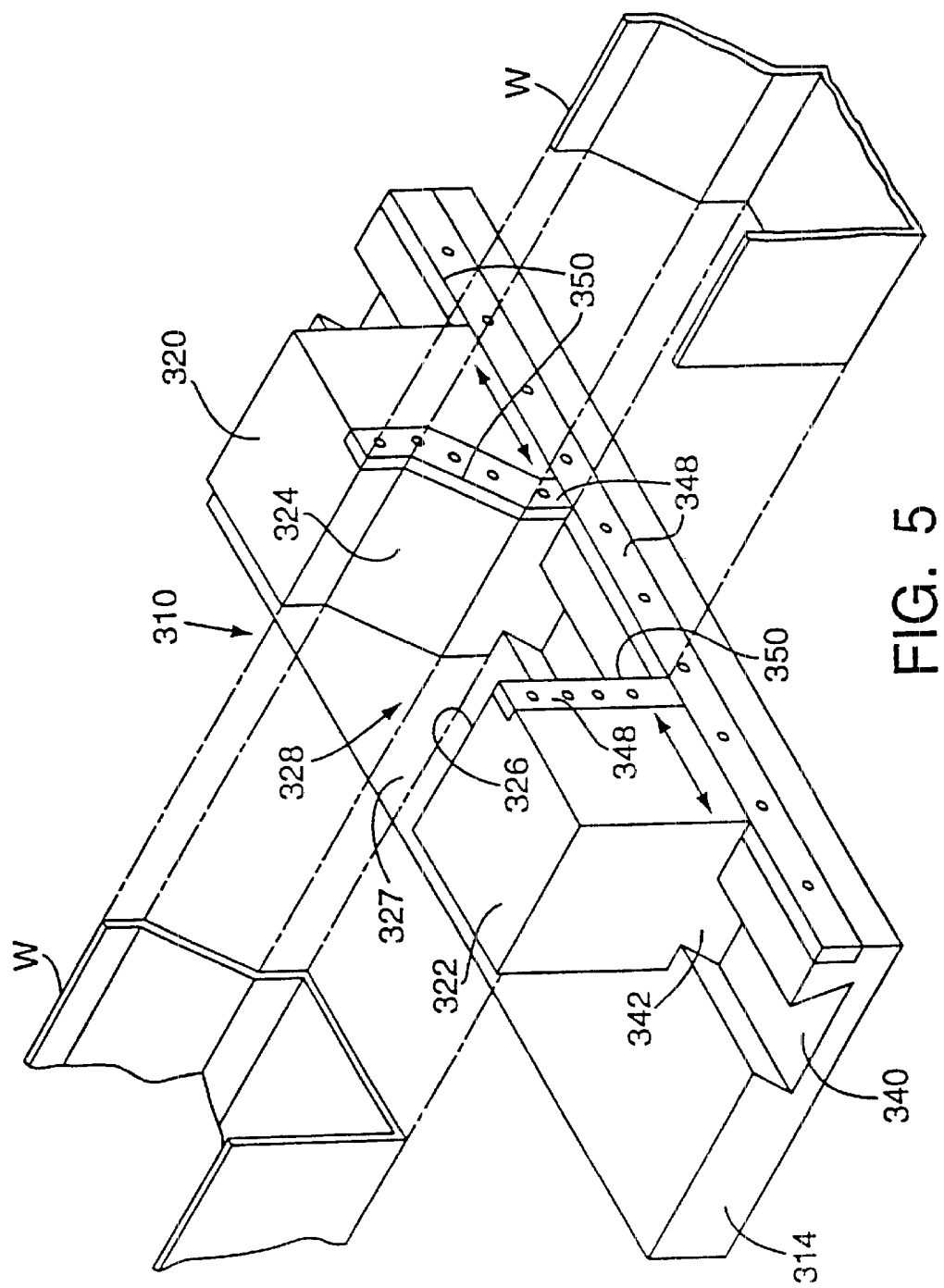
FIG. 5 is a perspective view of the typical base, first and second supports of another embodiment of an apparatus of the present invention wherein each of the first supports defines at least one non-planar support surface configuration for better conforming to the external surfaces of a workpiece.

In FIG. 5, the apparatus 310 is substantially the same as the apparatus 10 described above, and therefore like reference numerals preceded by the numeral 3 are used to indicate like elements. The primary difference of this embodiment is that at least one of the support surfaces defines a non-planar shape in order to better conform to the external configuration of a workpiece. In the example of FIG. 5, the right side of the workpiece W defines a non-planar surface configuration, and at least one of the first support surfaces 324 defines a shape substantially conforming to this non-planar shape. The respective blade bar 348 of the first support surface likewise defines a substantially conforming shape. As will be recognized by those skilled in the pertinent art, other support surfaces may define other planar or non-planar shapes in order to approximately conform to, and thereby support other commonly encountered workpieces.

Figure 6:
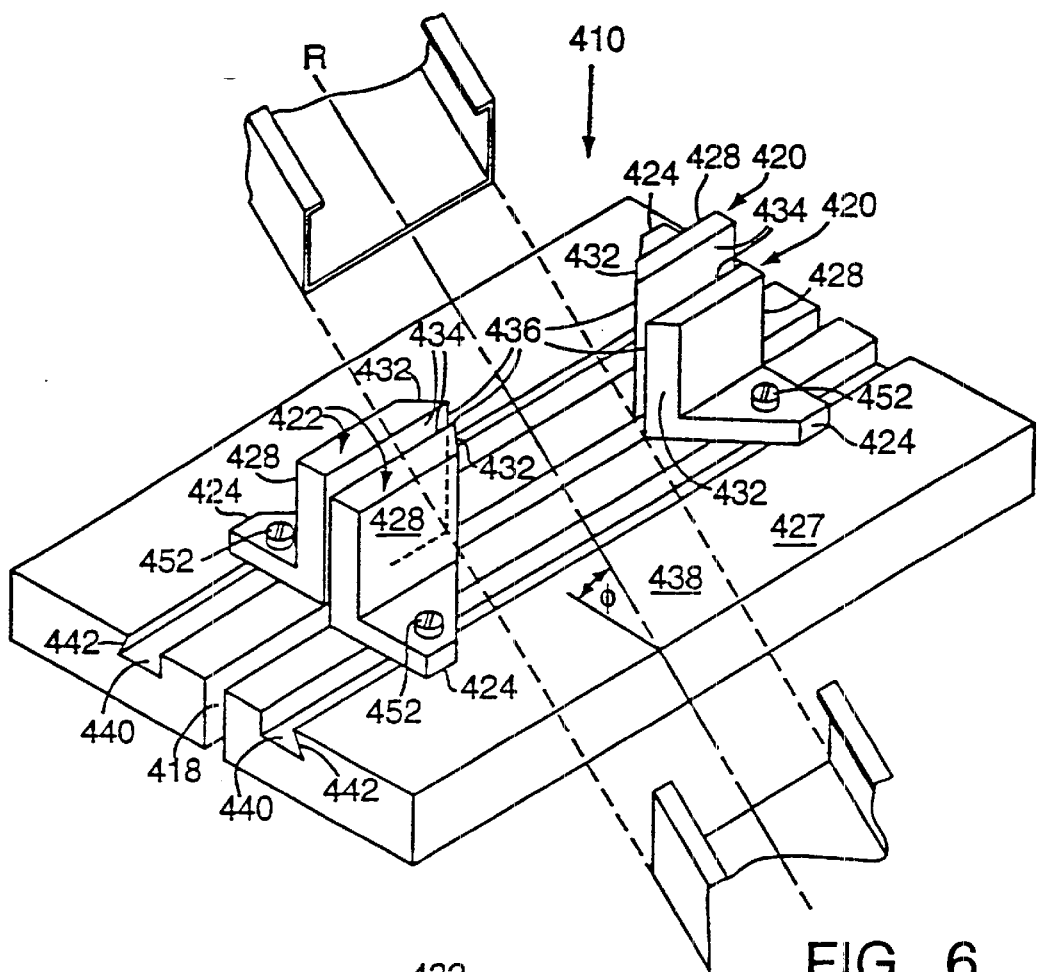
FIG. 6 is a perspective view of another embodiment of an apparatus of the present invention wherein the support surfaces are moveable relative to each other and define blade-like edges for connecting and supporting the workpiece at any desired angle relative to the plane of the blade to cut angled workpieces.

Referring to FIG. 6, the apparatus 410 is substantially the same as the apparatus 10 described above, and therefore like reference numerals preceded by the numeral 4 are used to indicate like elements. The primary difference between this embodiment and those described above is that the first and second pairs of supports, 420 and 422, respectively, each comprise a first support member 424 slidably mounted to a base support surface 427 and a second upstanding support member 428 connected to the respective first support member by at least one fastener 430, as shown typically in phantom in FIG. 7. Both the first and second support members, 424 and 428 respectively, are thin block-like members with the second support members 428 each having first and second upstanding surfaces, 432 and 434 respectively, defining blade-like edges 436 at their intersections for contacting and supporting the sides of the workpiece W. Preferably, each first upstanding surface 432 is oriented at approximately 45° relative to the respective second upstanding surface and the blade. However, as will be recognized by those skilled in the pertinent art, the first surfaces may be set at any of a variety of angles in order to accommodate a variety of workpiece shapes and configurations and to permit a predetermined range of angles to be cut.

In operation, each blade-like edge 436 engages the workpiece W along a discreet line of contact defined by the edge. Each of the supports 420 and 422 can be moved independently of, and offset relative to each other to form a channel 438 of a desired width W, and having an axis "R" oriented at a desired angle ø relative to the blade or blade gap 418.

The width W, and the angle ø are each set by selectively varying the positions of the supports 420 and 422 relative to one another. The workpiece is then placed in the channel 438 and supported on its sides along the four lines of contact defined by the blade-like edges 436. With the workpiece oriented in this manner, it can be cut at the desired angle ø relative to the axis "R" of the channel and the elongated axis of the workpiece received within the channel.

Figure 7:
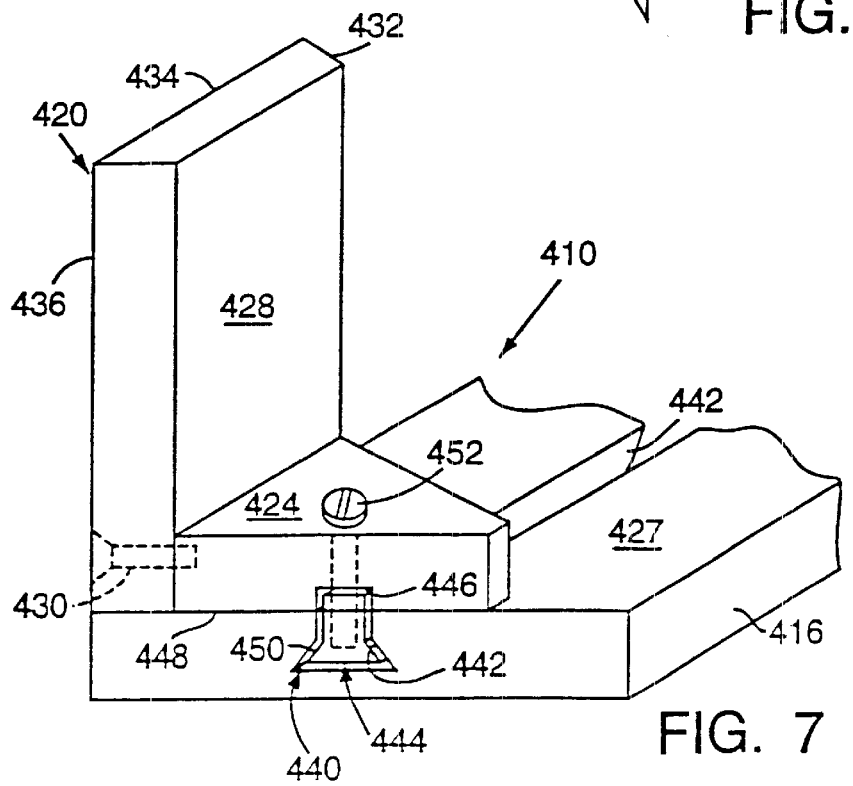
FIG. 7 is a partial, perspective view of the apparatus of FIG. 6, showing an embodiment of the supports, wherein each support is releasably secured against the base support by a dovetail-shaped guide member.

As shown in FIGS. 6 and 7, the base support surfaces 427 define two mounting slots 440 with the blade slot 418 located therebetween and approximately parallel to the mounting slots. In the illustrated embodiment, the mounting slots 440 are each defined by dove-tail-shaped side walls 442 formed within the base support surface 418.

As shown typically in FIG. 7, four guide members 444 are received within the mounting slots 440, and each engages a respective groove 446 defined by an underside 448 of each of the first support members 424. Preferably, each of the guide members 444 defines a mating dove-tail-shaped base 450 adapted to engage the dove-tail-shaped portions 442 of the mounting slots 440. At least one fastener 452 extends through each of the first support members 424 and threadedly engages the respective guide member 444.

In operation, the supports 420 and 422 are selectively positioned along the mounting slots 440 and can be secured in place by tightening the fasteners 452 to thereby draw the mating dove-tail-shaped portions 450 of the guide members 444 against the respective dove-tail-shaped portions 442 defined by the mounting slots 440. While dove-tail-shaped portions have been shown and described, the present invention is not limited in this regard as other shaped portions, such as rectangular or circular-shaped portions, may be substituted without departing from the broader aspects of the present invention.

Figure 8:
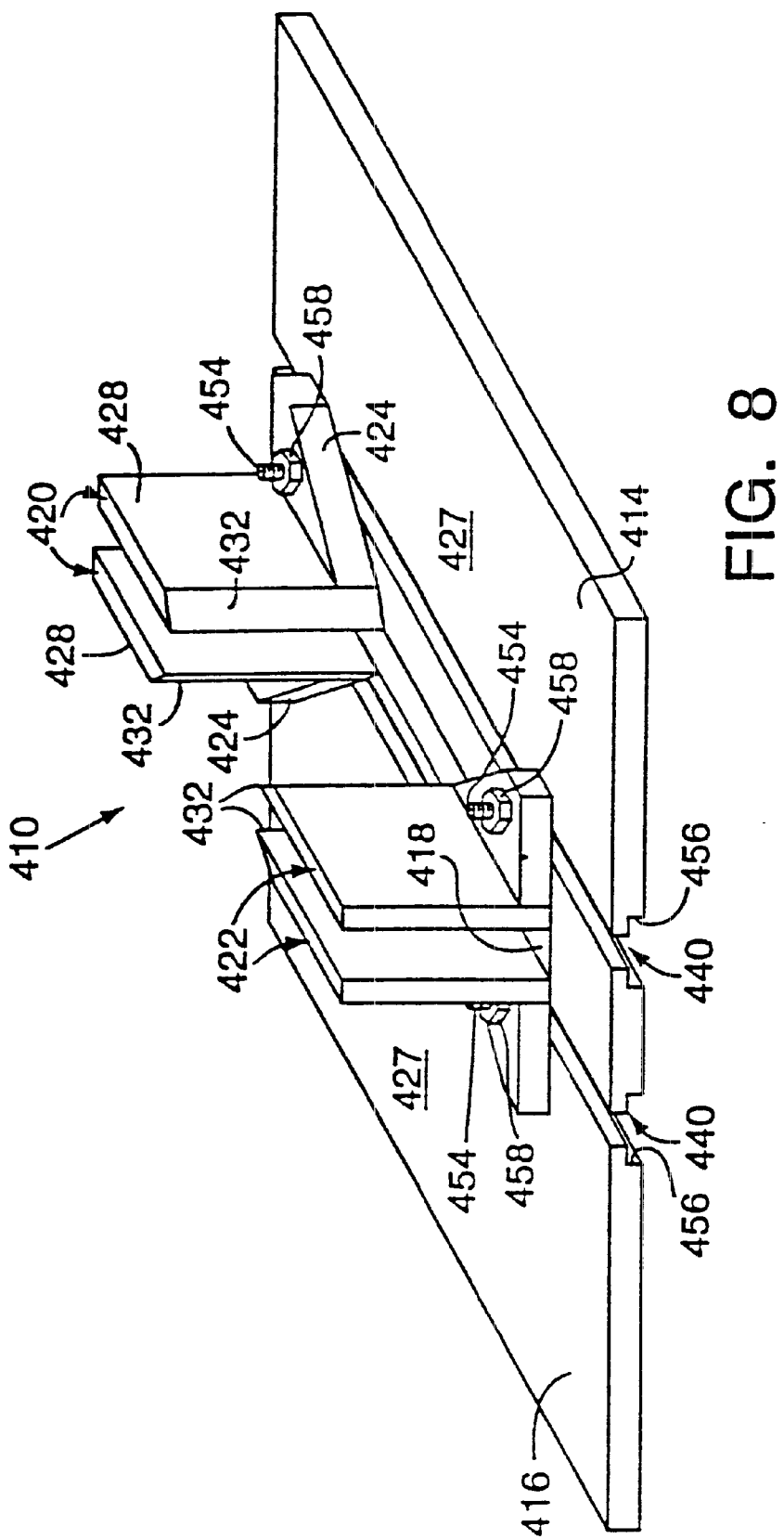
FIG. 8 is a perspective view of another embodiment of the apparatus of the present invention wherein the supports are releasably secured to the base support surfaces by fasteners, the head portion of each fastener being seated in an expanded section of a respective mounting slot defined by the base supports, and wherein a nut is threaded onto the portion of each fastener that extends above the respective support and can be selectively loosened or tightened to allow the supports to be moved or releasably secured in place.

Turning to FIG. 8, the first support members 424 are releasably secured to the base support surfaces 427 by fasteners 454 without the use of dove-tail-shaped guide members or like components, as described above. The head portion (not shown) of each fastener 454, or a washer or like component (not shown) seated between the head and the base support 426, so slidably engages an expanded section 456 formed on the underside of the mounting slot 440 of the respective base support 414 or 416. A nut 458 is threaded onto the portion of each fastener 456 that extends above the first support member 424 and can be selectively loosened or tightened to allow the supports 420 and 422 to be moved or releasably secured in place.

Turning to FIGS. 9–13, another embodiment of an apparatus of the present invention is illustrated generally at 510. Elements of the apparatus 510 that are similar to those of the apparatus 10 described above have been given like reference numerals proceeded by the numeral 5. In this embodiment each pair of first and second support surfaces are clamped together and to the base support assembly, and the blade comprises a cutting edge with multiple cutting tips.

Figure 9:
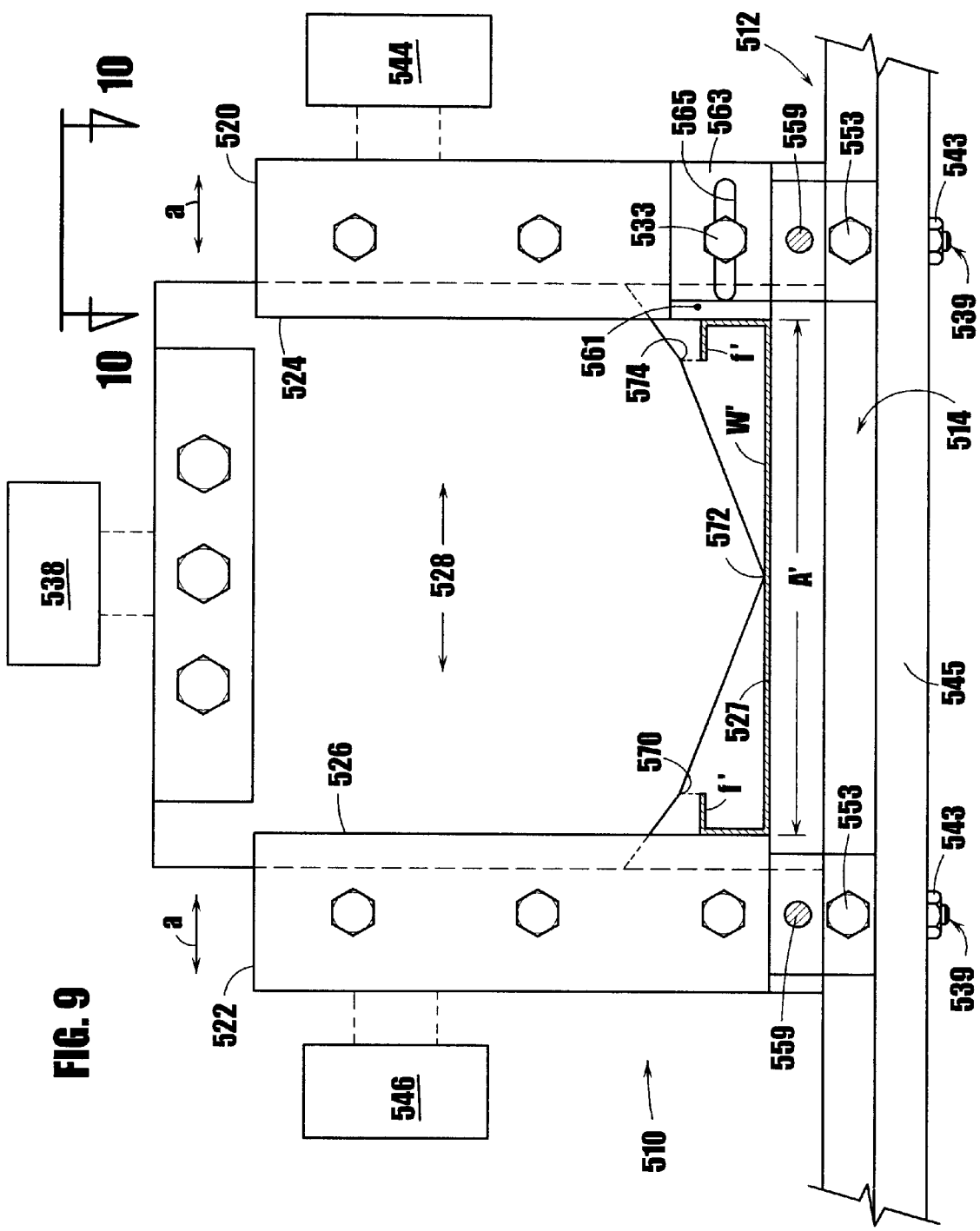
FIG. 9 is a front elevational view of another embodiment of an apparatus of the present invention wherein each pair of first and second support surfaces are fixedly secured to each other and to the base support assembly, and the blade comprises a cutting edge with multiple cutting tips.
Figure 10:
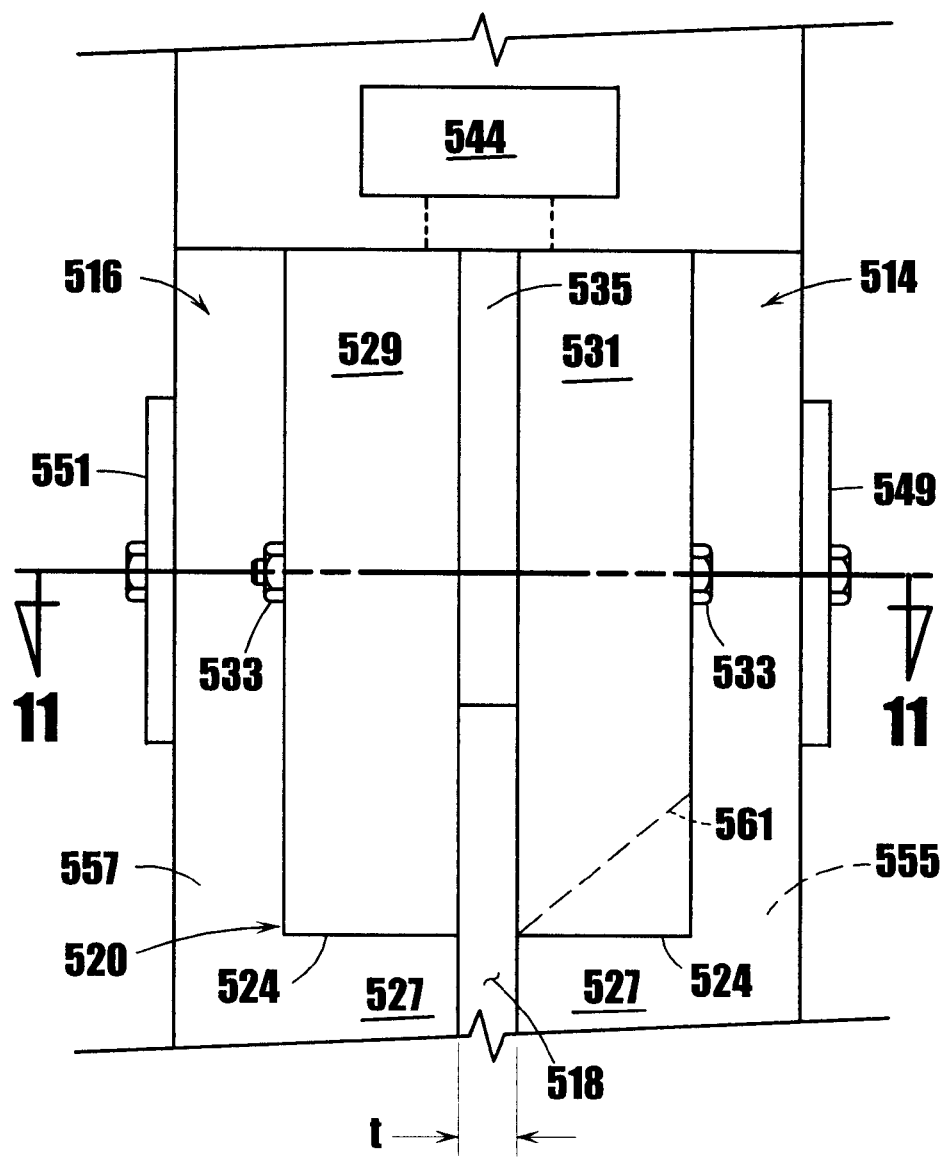
FIG. 10 is an enlarged top plan view taken along line 10—10 of FIG. 9 showing one pair of support surfaces and a portion of the base support assembly.
Figure 11:
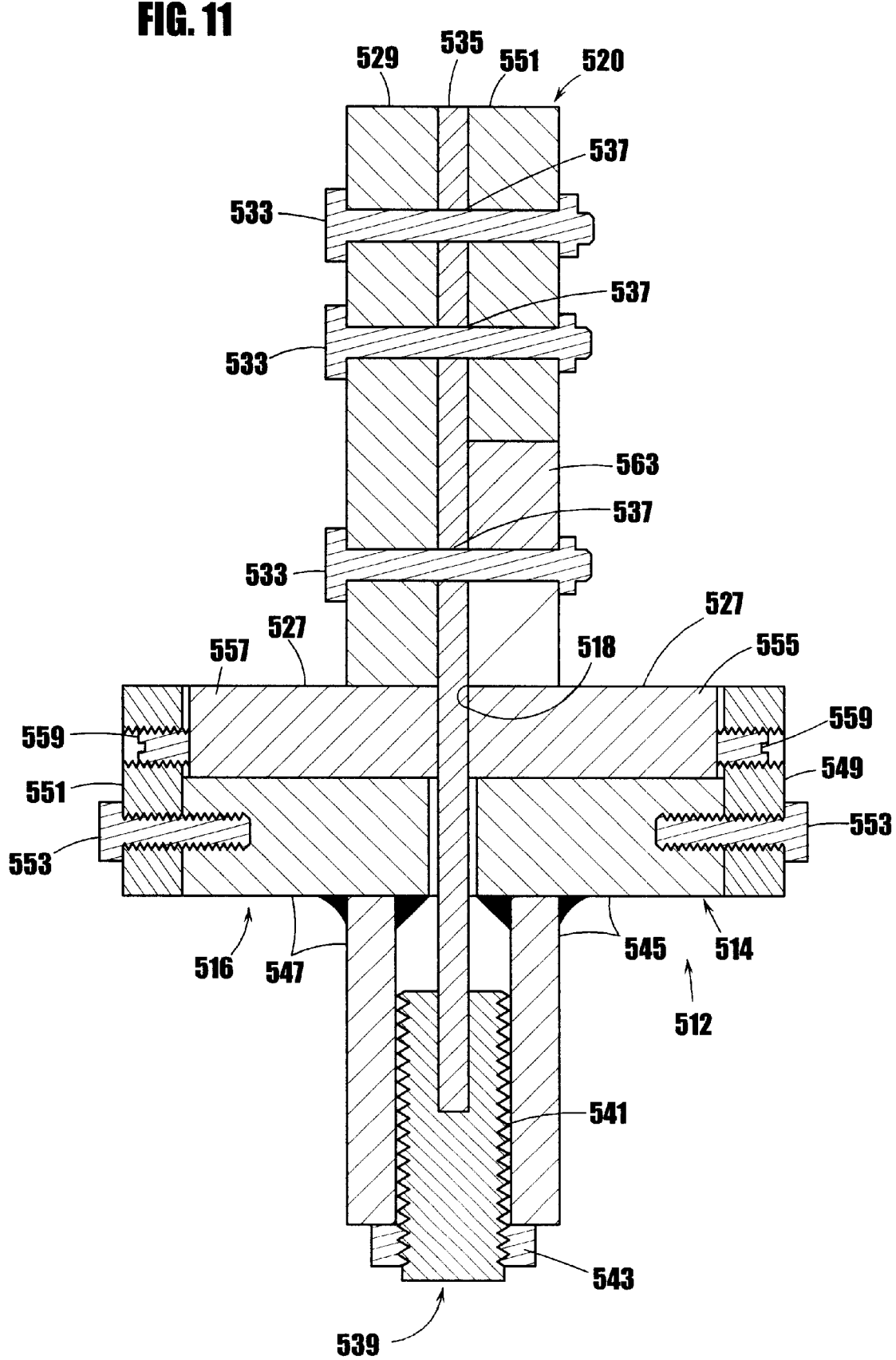
FIG. 11 is a cross sectional view of the pair of support surfaces and base support assembly taken along line 11—11 of FIG. 10.

Referring now to FIGS. 9, 10 and 11, the apparatus 510 comprises a base assembly 512 including a first base support 514 and a second base support 516 each of which define an elongated edge separated by, as shown in FIG. 11, a blade gap 518. As shown in FIG. 9, a pair of first supports 520 are provided that are movably mounted on one side of the first and second base supports 514 and 516, respectively, and a pair of second supports 522 are each movably mounted on the opposite sides of the first and second supports. Each first support 520 defines at least one first support surface 524 for engaging a first side of a workpiece W', and each second support 522 defines at least one second support surface 526 for engaging a second side of the workpiece W'. Each base support 514 and 516 similarly defines a third support surface 527 extending between the first and second support surfaces 524 and 526, respectively, for engaging and supporting a third side of the workpiece. The first support surfaces 524 are spaced apart from and face the second support surfaces 526, thus defining a channel 528 therebetween for receiving the workpiece W'. Similar to the embodiments discussed above, at least one of the first and second support surfaces 524 and 526, respectively, is movable relative to the support surface on the opposite side of the channel 528 for adjusting the width A' of the channel to thereby engage with each support surface the respective sides of workpieces of different widths.

Referring to FIGS. 10 and 11, the first support 520 will now be described in further detail, although it will be understood that the second support 522 may be similar and for clarity the second support will not be described in detail. The first support 520 may be composed of metallic substance similar to the embodiments described above and comprises a pair of upstanding members 529 and 531 that are interconnected or secured together via fasteners 533. The upstanding members 529 and 531 are disposed about a shim 535 which, as shown in FIG. 10, defines a thickness (t) of a blade gap 518. It will be appreciated that the thickness (t) of the shim may be varied depending on the size of a shearing means or blade 530. The shim 535 may be formed from a piece of metallic flat stock having a generally rectangular outer configuration and may comprise apertures 537 wherethrough fasteners 533 may extend. As shown in FIG. 11, the shim 535 terminates in a locking device 539 which may include a threaded rod 541 connected thereto by suitable means, such as welding. A nut 543 may be employed for securing the first support 520 into engagement with the first and second base supports 514 and 516.

As further shown in FIG. 11, the first and second base supports 514 and 516 may each comprise a respective support bracket 545 and 547, and each support bracket may be formed by two members welded or otherwise fixedly together to form a generally inverted L-shape. It will be appreciated that any suitably strong and durable structure or configuration of the support brackets 545 and 547 may be employed depending upon, e.g., the dimensions and material of the workpiece to be cut. A pair of coupling members 549 and 551 are employed that may be connected via fasteners 553 to the support brackets 545 and 547. Drive sources 538, 544 and 546, similar to those discussed above, may be employed in connection with this embodiment of the present invention.

A pair of base members 555 and 557 are disposed on support brackets 545 and 547 and together comprise the third support surface 527. The base members 555 and 557 are secured to shim 535 via, e.g., set screws 559, each located on a respective coupling member 549 and 551, to thereby define the width of the blade gap 518 extending through the third support surface 527. Referring again to FIG. 9, a portion 561 of the first support surface 524 may be angled at an acute angle of approximately 45° relative to the plane defined by the blade 530 in order to provide for angular cuts similar to that described above in connection with FIG. 6. Correspondingly, second support surface 526 preferably comprises another angled portion (not to shown) located diagonally opposite from that of portion 561 such that a workpiece W' may be accommodated for an angular cut. It will be recognized that the portions 561 may be angled at any particular angle in order to accommodate a variety of workpiece shapes and to permit a predetermined range of angular cuts to be made. It will also be recognized that similar to the embodiment of FIG. 6 four angular surface portions, rather than two, may be employed. In order to adjust the contact location between the angled portion 561 and the workpiece W', a segment 563 of the first support 520 may be separately movable therefrom. To allow separate movement and locking of the segment 563, a slot 565 may be formed in the segment wherethrough the fastener 533 may be disposed. As indicated by the arrow in FIG. 9, the segment 563 may be moved laterally relative to the remainder of the support 520 and then locked in a selected position by adjusting the respective fastener 533.

Figure 12:
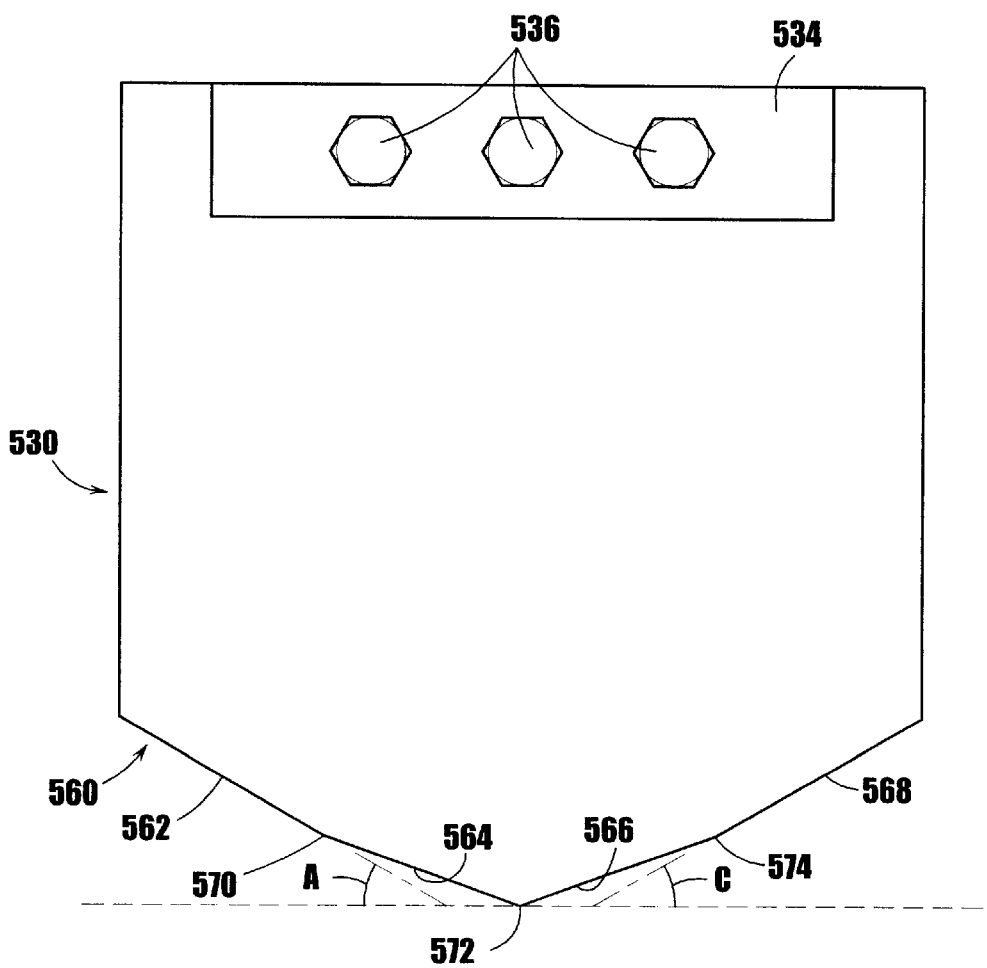
FIG. 12 is a front elevational view of the blade of FIG. 9.
Figure 13:
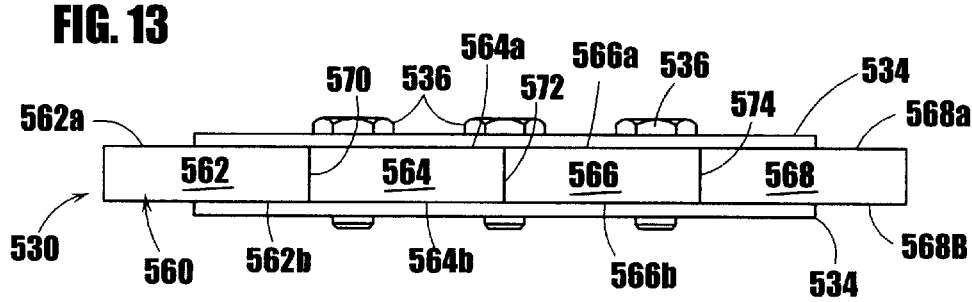
FIG. 13 is an end view of the blade of FIG. 12.

As illustrated in FIGS. 12 and 13, the blade 530 comprises a support flange 534 affixed by, e.g., fasteners 536 similar to that described above in conjunction with FIG. 1. The blade 530 is generally planar and has a transverse axis that is generally parallel to the longitudinal axis of the support flange 534. The blade 530 includes a cutting edge 560 that comprises multiple planar surfaces 562, 564, 566 and 568 each of which comprises cutting side edges, e.g., 562a, 562b, 564a, 564b, etc. The surfaces 562, 564, 566 and 568 are illustrated as planar, although, it will be appreciated that a serration or relatively small teeth may be disposed on the surface. Each surface is separated by cutting tips 570, 572 and 574. It will be recognized that while three cutting tips are preferable, additional cutting tips such as five or seven may be employed. The multiple surface and cutting tip configuration of this embodiment of the cutting blade functions to apply additional pressure adjacent each of the cutting tips 570, 572 and 574 beyond that of the surfaces 562, 564, 566 and 568 for puncturing, cutting and/or creating multiple fractures through a workpiece. In addition, as shown in FIG. 9, cutting tips 570 and 574 are advantageously located such that they may act to puncture and shear flanges f of the workpiece W'. This multi-tip structure has been found to be particularly advantageous since the flanges f' are supported at only one end and thus may tend to bend rather than be cut when less than three cutting tips are employed.

Each of the tips 570, 572 and 574 is formed by the intersection of planes defined by surfaces 562, 564, 566 and 568, respectively, at angles A, B and C. Angles A and C are preferably substantially the same and are greater than angle B, and may be within the range of between approximately 30° and approximately 60°, and are preferably approximately 45°. Angle B may be within the range of approximately 20° and approximately 40°, and is preferably approximately 30°.

The device of FIGS. 9–13 may be operated in a similar manner to the embodiments discussed above and thus the following description will focus mainly on differences in operation of the present embodiment. In particular, the workpiece W' is located in the channel 528 and the first and second supports 520 and 522 may be moved into engagement therewith via, e.g., drive sources 544, 546 after loosening of nuts 543. The blade 530, driven by the drive source 538, may then puncture and shear the workpiece W' as described above. If it is desired that the workpiece W' be cut at a particular angle, e.g., a 45°, to the longitudinal axis of the workpiece, fastener 533 (or fasteners 533 in the event that more than one segment 563 is employed) may be loosened and segment 563 may be moved into the channel 528 to engage a side (not numbered) of the workpiece. The shims 535 located between upstanding members 529 and 531 may be replaced, e.g. depending upon a thickness (t') of the blade 530 as described above, via removal of fasteners 533 and nut 543 and loosening of set screws 559 of the base members 555 and 557.

As will be recognized by those skilled in the pertinent art, numerous changes and modifications may be made to the above-described and other embodiments of the present invention, without departing from its scope as defined in the appended claims. For example, the first and second base supports may be adjustable relative to each other in order to thereby adjust the thickness or width of the blade gap. Alternatively, the first and second base supports may be formed by a single or unitary support having an elongated slot or groove forming the blade gap. Similarly, each pair of first and second supports may be connected together, or formed as a single or unitary support, which may in turn be driven by a common drive source. The support surfaces may likewise be formed in any of numerous different shapes and/or configurations in order to better conform to, and thereby fixedly support a workpiece to effect a cutting operation as described above. The configuration of the support surfaces need not exactly conform to the configuration of the workpiece. Indeed, the particular configuration of a support surface may be selected in order to adequately support a plurality of workpieces having different configurations, but may not be identical to the configuration of any one or all of such workpieces. Accordingly, this detailed description of preferred embodiments is to be taken in an illustrative, as opposed to a limiting sense.

What is claimed is:

1. An apparatus for shearing workpieces having at least two sides formed of sheet-like material, comprising:

first means defining an elongated edge and being engageable with a first side of the workpiece for contacting and supporting the first side of the workpiece along a line defined by the edge;

a second means defining an elongated edge and being engageable with a second side of the workpiece for contacting and supporting the second side of the workpiece, the second means being spaced apart from and facing the first means and defining a channel therebetween for receiving the workpiece, wherein at least one of the first and second means is independently movable relative to the other for engaging with each elongated edge the respective sides of workpieces of different widths; and means slidably received within a gap formed adjacent to the elongated edges of the first and second means and being movable between a first position spaced away from the workpiece within the channel and a second position in engagement with the workpiece for shearing the workpiece along a line of contact;

wherein at least one of the first and second means is selectively positionable relative to the other for orienting an axis of the workpiece at a predetermined angle relative to a plane of the shearing means and shearing the workpiece at a predetermined angle relative to its axis.

2. An apparatus as defined by claim 1, wherein the first and second means comprise first and second pairs of supports, and the apparatus further comprises a base support defining a support surface extending between the elongated edges and being engageable with a third side of the workpiece.

3. An apparatus as defined by claim 2, wherein the base support comprises a pair of base members slidably disposed on the base support and wherein the first and second pairs of supports each comprise a pair of upstanding members wherein at least one of the pairs of upstanding members is slidably disposed on the base members.

4. An apparatus as defined by claim 3, further comprising a pair of shims, each shim being disposed between a respective pair of upstanding members and the base members to thereby separate the upstanding members and the base members and define the width of the gap therebetween.

5. An apparatus as defined by claim 4, further comprising:
   means for fastening each upstanding member of a respective pair of upstanding members together;
   a locking device for locking each pair of upstanding members into engagement with the base members; and
   means for urging each of the base members into engagement with a respective shim.

6. An apparatus as defined by claim 5, wherein:
   the base support further comprises a pair of mounting brackets defining an opening therebetween and the locking device is disposed within the opening; and
   the base members are each slidably supported by a respective mounting bracket.

7. An apparatus as defined by claim 6, wherein the means for urging each of the base members into engagement with a respective shim comprises a pair of coupling members, each coupled to a respective mounting bracket and comprising a set screw configured to engage a respective base member.

8. An apparatus as defined by claim 3, wherein a respective one of the first and second upstanding members includes a segment having a surface defining a plane which is oriented at an acute angle relative to the blade.

9. An apparatus as defined by claim 1, wherein the shearing means comprises a blade having a cutting edge comprising a plurality of cutting tips.

10. An apparatus as defined by claim 9, wherein the cutting edge comprises at least four substantially planar surfaces and wherein one planar surface separated from another planar surface by a cutting tip.

11. An apparatus as defined by claim 10, wherein the three cutting tips comprise a pair of cutting tips disposed at an angle that is within the range of between approximately 20° and approximately 40° to a transverse axis of the blade and a third cutting tip disposed at an angle that is within the range of approximately 30° and approximately 60° to the transverse axis of the blade.

12. An apparatus as defined by claim 10, wherein the three tips comprise a pair of cutting tips disposed at an angle of approximately 45° to a transverse axis of the blade and a third cutting tip disposed at an angle of approximately 30° to the transverse axis of the blade.

13. An apparatus as defined by claim 2, wherein each support of said first and in second pairs of supports includes a first support portion slidably mounted on the base support surface and a second support portion upstanding relative to the elongated edge for engaging a respective side of the workpiece.

14. An apparatus as defined by claim 13, wherein:
   each of the second support portions includes upstanding first and second surfaces and wherein the elongated edge is defined by the intersection of the first and second surfaces.

15. An apparatus as defined by claim 14, wherein at least one of the upstanding first and second surfaces defines an acute angle relative to the blade.

16. An apparatus for shearing workpieces having at least two sides formed of sheet-like material, comprising:
   a first support defining an elongated edge and being engageable with a first side of the workpiece for contacting and supporting the first side of the workpiece along a line defined by the edge;
   a second support defining an elongated edge and being engageable with a second side of the workpiece for contacting and supporting the second side of the workpiece, the second support being spaced apart from and facing the first support and defining a channel therebetween for receiving the workpiece, wherein each of the first and second supports is independently movable relative to the other for engaging with each elongated edge the respective sides of workpieces of different widths;
   a blade slidably received within a gap formed adjacent to the elongated edges of the first and second supports and being movable between a first position spaced away from the workpiece within the channel and a second position in engagement with the workpiece for shearing the workpiece along a line of contact and wherein the blade has a cutting edge comprising a plurality of cutting tips;
   a base support defining a support surface extending between the elongated edges and being engageable with a third side of the workpiece and the base support comprising at least one base member slidably disposed on the base support;
   wherein the first and second supports each comprise at least one upstanding member and at least one of the upstanding members being slidably disposed on the base member.

17. An apparatus as defined by claim 16, wherein at least one of the first and second upstanding members is dimensioned and configured to vary an axis of the workpiece at a predetermined angle relative to a plane of the shearing means.

18. A method of shearing workpieces having at least two sides formed of sheet-like material, comprising the steps of:
   providing a first support having an elongated edge which is engageable with a first side of the workpiece for contacting and supporting the first side of the workpiece along a line defined by the edge;
   providing a second support having an elongated edge which engageable with a second side of the workpiece for contacting and supporting the second side of the workpiece, the second support being spaced apart from and facing the first support and defining a channel therebetween for receiving the workpiece, wherein at least one of the first and second supports is independently movable relative to the other for engaging with each elongated edge the respective sides of workpieces of different widths; and
   receiving a blade within a gap formed adjacent to the elongated edges of the first and second supports and which is movable between a first position spaced away from the workpiece within the channel and a second position in engagement with the workpiece for shearing the workpiece along a line of contact;
   positioning at least one of the first and second supports relative to the other for orienting an axis of the workpiece at a predetermined angle relative to a plane of the shearing means, and shearing the workpiece at a predetermined angle relative to its axis.

19. The method of claim 18, wherein the method further comprises providing a base support defining a support surface extending between the elongated edges and being engageable with a third side of the workpiece.

20. The method of claim 19, wherein the base support comprises a pair of base members slidably disposed on the base support, the first and second pairs of supports each comprise a pair of upstanding members, and at least one of the pairs of upstanding members is slidably disposed on the base members.

* * * * *